United States Patent Office 3,455,924
Patented July 15, 1969

3,455,924
DIANISYLIMIDAZOLES
Daniel Lednicer, Portage, Mich., assignor to The Upjohn Company, Kalamazoo, Mich., a corporation of Delaware
No Drawing. Filed Feb. 8, 1967, Ser. No. 614,566
Int. Cl. C07d 51/42, 91/42; A61h 27/00
U.S. Cl. 260—256.4                14 Claims

ABSTRACT OF THE DISCLOSURE

A class of dianisylimidazoles having a ring-forming substituent on the imidazole radical, useful for the treatment of inflammations of non-bacterial origin, e.g., allergic inflammations, is produced by condensing a 2-aminopyridine, 2-aminopyrimidine, 2-aminooxazole, or 2-aminothiazole with α-bromodesoxyanisoin in an organic solvent at room temperatures.

FIELD OF THE INVENTION

The present invention is concerned with novel organic compounds and more particularly with anti-inflammatory and central nervous system stimulating dianisylimidazoles (III) and a process for the production thereof.

DESCRIPTION OF THE PRIOR ART

Imidazo[1,2-a]pyridines mono-aryl substituted are described in J. Applied Chem. (U.S.S.R.), 15, 151 (1942), C.A., 37, 2381; Rec. Trav. Chim. 68,441 (1949); J. Chem. Soc., 2815 (1958).

SUMMARY OF THE INVENTION

The novel anti-inflammatory and central nervous system stimulating compounds and the process for production thereof can be illustratively represented by the following formulae:

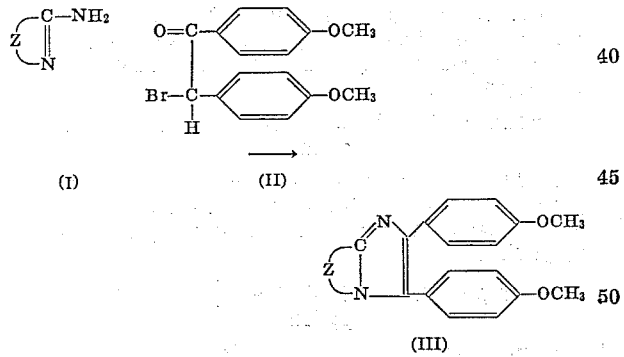

wherein Z is a bivalent radial selected from the group consisting of:

$-C=C-C=C-$     $-N=C-C=C-$
 $|\ |\ |\ |$           $|\ |\ |$
 $R_1\ R_2\ R_3\ R_4$      $R_1\ R_2\ R_3$ $-S-C=C-$   and   $-O-C=C-$
  $|\ \ |$              $|\ \ |$
  $R_1\ R_2$             $R_1\ R_2$ in which $R_1$, $R_2$, $R_3$ and $R_4$ are selected from the group consisting of hydrogen, lower alkyl and lower alkoxy having from 1 to 4 carbon atoms, inclusive, hydroxy and nitro.

Illustrative lower alkyl groups are methyl ethyl propyl isopropyl butyl isobutyl and the like.

Lower alkoxy groupss are the O-lower alkyl groups of above, illustratively, methoxy, ethoxy, propoxy, isopropoxy, butoxy, isobutoxy, and the like.

The process of the present invention comprises: reacting a 2-aminopyridine, 2-aminopyrimidine, 2- aminooxazole, or 2-aminothiazole of the Formula I, defined above, with α-bromodesoxyanisoin (II) in an organic solvent.

DETAILED DESCRIPTION

The novel imidazo compounds (III) of the present invention have activity as anti-inflammatory agents with up to 3 to 4 times the anti-inflammatory activity of butazolidine. Particularly useful as anti-inflammatory agents are those in which

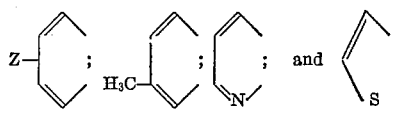

These compounds (III) are therefore well suiited for the treatment of inflammatory diseases and inflammations of non-bacterial origin, such as contact determatitis and allergic informations of mammals and birds. The novel compounds are also particularly useful for the treatment of mastitis in cattle.

Some of the compounds, e.g., 2,3-dianisylimidazo-[1,2-a]pyridine and 2,3-dianisylimidazo[1,2-a]pyrimidine are also stimulants for the central nervous system. They can be utilized to stimulate old or sick pet animals, such as dogs or cats in lethargic conditions due to age or sickness.

The starting compounds I are a known class and some are commercially available. They comprise 2-aminopyridines, 2-aminopyrimidines (see for example Robert C. Elderfield, "Heterocyclic Compounds," vol. 6, pp. 234–282, John Wiley and Sons, Inc., New York (1957)), 2-aminothiazoles, and 2-aminooxazoles. The 2-aminothiazoles can generally be prepared by condensation of thiourea and an α-haloketone:

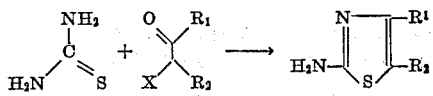

wherein $R_1$ and $R_2$ are as given about and X is halogen, preferably chorine or bromine.

In carrying out the process of the present invention, an α-amino-N-heterocyclic compound of Formula I is condensed with known α-bromodesoxyanisoin. In the preferred embodiment of this invention, the reaction is carried out in an organic solvent, particularly acetonitrile, with approximately equimolecular quantities of each of the reacting products, at about room temperature (about 20 to 30% C.) and freguency in a nitrogen atmosphere. The time of the reaction is between 6 and 96 hours at room temperature, usually between 12 and 48 hours. The α-amino-N-heterocyclic compounds, which are used in this reaction, are compounds such as 2-aminopyridine; 2-amino-5-nitropyridine; 2-amino-5-methylpyridine; 2-amino-4-methylpyridine; 2-aminopyrimidine; 2-amino-4-hydroxy-6-methylpyrimidine; 2-aminothiazole; 2-aminooxazole; 2-amino-5-nitrothiazole; 2-amino-4,6-dimethylpyrimidine and the like.

After the condensation reaction has been terminated the desired products are recovered by conventional procedures such as extraction, recrystallization, chromatography, and the like. The isolated products are generally purified by additional chromatography and recrystallization or the like.

The following examples are illustrative of the products and process of this invention, but are not to be construed as limiting:

Example 1.—2,3-dianisylimidazo[1,2-a]pyridine

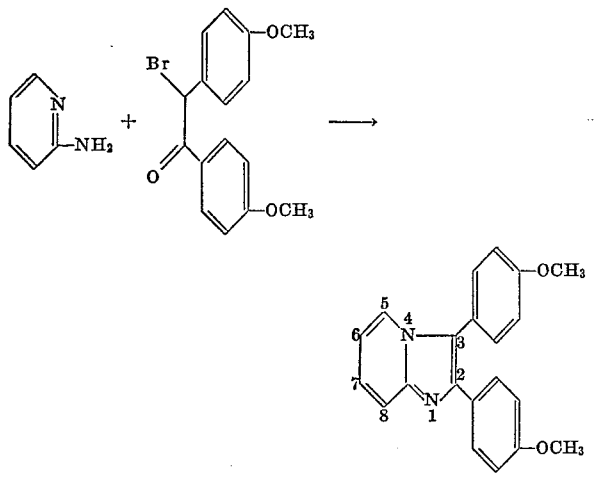

A solution of 1.88 g. of 2-aminopyridine and 6.70 g. of α-bromodesoxyanisoin in 60 ml. of acetonitrile was allowed to stand at room temperature (24–26° C.) under an atmosphere of nitrogen for a period of 18 hours. The dark solution was then diluted with water and extracted with ether. The organic layer was washed with 25 ml. of 2.5 N hydrochloric acid. The aqueous layer and the acid washings were combined and made basic with 45 percent aqueous potassium hydroxide solution, producing a gummy precipitate. The precipitate was taken up in ether and the ether solution washed with brine. The ether solution was then dried over anhydrous sodium sulfate and evaporated to give a residue. This residue was chromatographed over 200 ml. of Florisil anhydrous magnesium silicate using an eluant system of 10 percent acetone–90 percent Skellysolve B hexanes. The crystalline fractions containing the product were combined and recrystallized twice from ethyl acetate to give 1.70 g. of 2,3-dianisylimidazo[1,2-a]pyridine of melting point 145–147° C. Ultraviolet: $\lambda_{max.}$ 210 (44,050); 256 (40,900; 300 sh. (9,400).

Analysis.—Calcd. for $C_{21}H_{18}N_2O_2$: C, 76.34; H, 5.49; N, 8.48. Found: C, 76.16; H, 5.35; N, 8.49.

Example 2.—2,3-dianisyl-6-nitroimidazo[1,2-a]pyridine

A mixture of 3.35 g. of α-bromodesoxyanisoin and 1.40 g. of 2-amino-5-nitropyridine in 50 ml. of acetonitrile was stirred overnight (18 hours) at room temperature (23 to 26° C.). The solid which had precipitated was removed by filtration. The filtrate was diluted with 2.5 N hydrochloric acid and washed with ether. The organic layer was backwashed once with acid. The combined aqueous portions were made basic and the precipitated oil dissolved in ether:methylene chloride. The oily solid which was obtained, when this last solution was taken to dryness, was recrystallized twice from methanol to give 0.35 g. of 2,3-dianisyl-6-nitroimidazo[1,2-a]pyridine of melting point 194–195° C. Ultraviolet: $\lambda_{max.}$ 236 (27,750); 306 (27,580).

Analysis.—Calcd. for $C_{21}H_{17}N_3O_4$: C, 67.19; H, 4.57; N, 11.20. Found: C, 67.61; H, 5.03; N, 11.35.

Example 3.—2,3-dianisyl-6-methylimidazo[1,2-a]pyridine

A mixture of 1.08 g. of 2-amino-5-methylpyridine and 3.35 g. of α-bromodesoxyanisoin in 30 ml. of acetonitrile was stirred at room temperature for 3 days. The resulting solution was diluted with water, extracted with ether, the organic layer was washed with 2.5 N hydrochloric acid and the aqueous layer and acidic washings were combined, basified with aqueous potassium hydroxide solution and evaporated to give a residue. This residue was chromatographed over Florisil anhydrous magnesium silicate with an eluant consisting of 10 percent acetone-90 percent Skellysolve B hexanes. The fractions containing the product were recrystallized three times from moist Skellysolve B hexanes to give 0.78 g. of 2,3-dianisyl-6-methylimidazo-[1,2-a]pyridine as a hydrate of melting point 136–139° C.

Analysis.—Calcd. for $C_{22}H_{20}N_2O_2 \cdot \frac{1}{2}H_2O$: C, 74.77; H, 5.87; N, 7.93. Found: C, 75.25; H, 5.72; N, 7.77.

This hydrate was kept at 40° C. in a vacuum of 0.5–0.6 mm. of Hg for 72 hours to give water-free 2,3-dianisyl-6-methylimidazo[1,2-a]pyridine.

Example 4.—2,3-dianisyl-7-methylimidazo[1,2-a]pyridine

In the manner given in Example 1, 1.08 g. of 2-amino-4-methylpyridine and α-bromodesoxyanisoin (3.35 g.) were reacted to give 0.77 g. (after recrystallization from ether-Skellysolve B hexanes) of 2,3-dianisyl-7-methylimidazo[1,2-a]pyridine of melting point 141–143° C.

Analysis.—Calcd. for $C_{22}H_2ON_2O_2$: C, 76.72; H, 5.88; N, 8.13. Found: C, 76.40; H, 5.89; N, 7.70.

Example 5.—2,3-dianisyl-6-methoxyimidazo[1,2-a] pyridine

In the manner given in Example 1, 2-amino-5-methoxypyridine and α-bromodesoxyanisoin in acetonitrile were stirred at room temperature for 48 hours to give 2,3-dianisyl-6-methoxyimidazo[1,2-a]pyridine.

Example 6.—2,3-dianisyl-6-hydroxyimidazo[1,2-a] pyridine

In the manner given in Example 1, 2-amino-5-hydroxypyridine and α-bromodesoxyanisoin in acetonitrile were reacted together to give 2,3-dianisyl-6-hydroxyimidazo-[1,2-a]pyridine.

Example 7.—2,3-dianisyl-7-butoxyimidazo[1,2-a] pyridine

In the manner given in Example 1, 2-amino-4-butoxypyridine and α-bromodesoxyanisoin in acetonitrile were reacted together to give 2,3-dianisyl-6-ethoxy-amidazo-[1,2-a]pyridine.

Example 8.—2,3-dianisyl-6-ethoxyimidazo[1,2-a] pyridine

In the manner given in Example 1, 2-amino-5-ethoxypyridine and α-bromodesoxyanisoin in acetonitrile were reacted together to give 2,3-dianisyl-7-ethoxy-amidazo-[1,2-a]pyridine.

Example 9.—2,3-dianisyl-6-propylimidazo[1,2-a] pyridine

In the manner given in Example 1, 2-amino-5-propylpyridine and α-bromodesoxyanisoin in acetonitrile were reacted together to give 2,3-dianisyl-6-propylimidazo[1,2-a]pyridine.

Example 10.—2,3-dianisyl-6-butylimidazo[1,2-a] pyridine

In the manner given in Example 1, 2-amino-5-butylpyridine and α-bromodesoxyanisoin in acetonitrile were reacted together to give 2,3-dianisyl-6-butylimidazo-[1,2-a]pyridine.

Example 11.—2,3-dianisyl-7-ethylimidazo[1,2-a]pyridine

In the manner given in Example 1, 2-amino-4-ethylpyridine and α-bromodesoxyanisoin in acetonitrile were reacted together to give 2,3-dianisyl-7-ethylimidazo[1,2-a]pyridine.

Example 12.—2,3-dianisyl-8-isopropylimidazo[1,2-a] pyridine

In the manner given in Example 1, 2-amino-3-isopropylpyridine and α-bromodesoxyanisoin in acetonitrile were reacted together to give 2,3-dianisyl-8-isopropylimidazo-[1,2-a]pyridine.

In the manner given in Example 1, other 2,3-dianisylimidazo[1,2-a]pyridines are produced by reacting a substituted 2-aminopyridine with α-bromodesoxyanisoin in acetonitrile. Representative products thus obtained include:

2,3-dianisyl-5-hydroxyimidazo[1,2-a]pyridine;
2,3-dianisyl-8-ethylimidazo[1,2-a]pyridine;
2,3-dianisyl-7-isopropoxyimidazo[1,2-a]pyridine;
2,3-dianisyl-6-propoxyimidazo[1,2-a]pyridine;
2,3-dianisyl-6-nitro-7-ethylimidazo[1,2-a]pyridine;
2,3-dianisyl-6-hydroxy-7-propylimidazo[1,2-a]pyridine;
2,3-dianisyl-6-methyl-7-hydroxyimidazo[1,2-a]pyridine;
2,3-dianisyl-5-ethylimidazo[1,2-a]pyridine;
2,3-dianisyl-5-propylimidazo[1,2-a]pyridine;
2,3-dianisyl-5-butylimidazo[1,2-a]pyridine; and the like.

Example 13.—2,3-dianisylimidazo[1,2-a]pyrimidine

A solution of 1.3 g. of 2-aminopyrimidine and 4.5 g. of α-bromodesoxyanisoin in 40 ml. of acetonitrile was allowed to stand for 24 hours at room temperature. The solution was then diluted with water and extracted with ether. The organic layer was then extracted several times with 1.2 N hydrochloric acid. The acidic extracts and the aqueous layer were combined, basified with potassium hydroxide and the precipitated gum was taken up in ether: methylene chloride. This last solution was washed with water, dried, and evaporated. The dark semi-solid residue which resulted was recrystallized from acetone to give 1.12 g. of 2,3-dianisylimidazo[1,2-a]pyrimidine of melting point 218–221° C. Ultraviolet: $\lambda_{max}$. 254 (25,500); 280 sh. (13,800); 359 (9,350).

Analysis.—Calcd. for $C_{20}H_{17}N_3O_2$: C, 72.49; H, 5.17; N, 12.68. Found: C, 72.47; H, 5.52; N, 12.64.

Example 14.—2,3-dianisyl-7-hydroxy-5-methylimidazo[1,2-a]pyrimidine

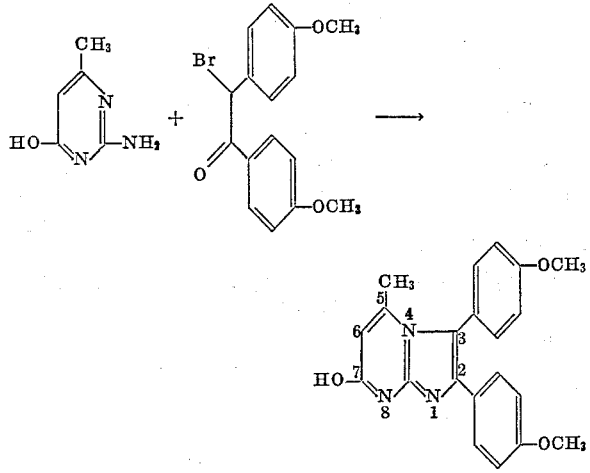

A suspension of 1.25 g. of 2-amino-4-hydroxy-6-methylpyrimidine and 3.35 g. of α-bromodesoxyanisoin in 30 ml. of acetonitrile was stirred until complete solution was achieved (20 hours). The solution was then diluted with water and extracted with ether. The organic layer was washed with dilute hydrochloric acid and the acid washings were combined with the aqueous layer. The combined aqueous portions were made basic with aqueous potassium hydroxide solution and the precipitated gum taken up in methylene chloride. The methylene chloride solution was evaporated to dryness, and the residue thus obtained was chromatographed over 200 ml. of Florisil anhydrous magnesium silicate. The column was eluted with solvent mixtures consisting of 15 percent and 30 percent acetone, balance Skellysolve B hexanes. The fractions obtained with the 30 percent acetone–70 percent Skellysolve B hexanes mixture were combined and treated with a small amount of methanol whereby precipitated 70 mg. of unreacted 2-amino-4-hydroxy-6-methylpyrimidine of melting point 292–298° C. This material was recovered by filtration. The filtrate was taken to dryness to give a gum which crystallized on standing. It was recrystallized twice from ethyl acetate to give 0.54 g. of 2,3-dianisyl-7-hydroxy-5-methylimidazo[1,2-a]pyrimidine as ethyl acetate solvate of melting point 99–104° C. (foaming).

Analysis.—Calcd. for $C_{21}H_{19}N_3O_3 \cdot 1/2CH_3CO_2C_2H_5$: C, 68.13; H, 5.72; N, 10.37. Found: C, 67.83; H, 6.59; N, 10.12.

The ethyl acetate solvate of 2,3-dianisyl-7-hydroxy-5-methylimidazo[1,2-a]pyrimidine was then kept for 72 hours at a vacuum of 0.1 mm. mercury at a temperature of 45° C. to give 2,3-dianisyl-7-hydroxy-5-methylimidazo-[1,2-a]pyrimide.

Example 15.—2,3-dianisyl-5-methylimidazo[1,2-a]pyrimidine

In the manner given in Example 13, 2-amino-6-methylpyrimidine and α-bromodesoxyanisoin were reacted together in acetonitrile to give 2,3-dianisyl-5-methylimidazo-[1,2-a]pyrimidine.

Example 16.—2,3-dianisyl-7-isobutylimidazo[1,2-a]pyrimidine

In the manner given in Example 13, 2-amino-4-isobutylpyrimidine and α-bromodesoxyanisoin were reacted together in acetonitrile to give 2,3-dianisyl-7-isobutylimidazo[1,2-a]pyrimidine.

Example 17.—2,3-dianisyl-5-butoxyimidazo[1,2-a]pyrimidine

In the manner given in Example 13, 2-amino-6-butoxypyrimidine and α-bromodesoxyanisoin were reacted together in acetonitrile to give 2,3-dianisyl-5-butoxyimidazo[1,2-a]pyrimidine.

Example 18.—2,3-dianisyl-6-ethylimidazo[1,2-a]pyrimidine

In the manner given in Example 13, 2-amino-5-ethylpyrimidine and α-bromodesoxyanisoin were reacted together in acetonitrile to give 2,3-dianisyl-6-ethylimidazo[1,2-a]pyrimidine.

Example 19.—2,3-dianisyl-6-nitroimidazo[1,2-a]pyrimidine

In the manner given in Example 13, 2-amino-5-nitropyrimidine and α-bromodesoxyanisoin were reacted together in acetonitrile to give 2,3-dianisyl-6-nitroimidazo[1,2-a]pyrimidine.

Example 20.—2,3-dianisyl-7-hydroxyimidazo[1,2-a]pyrimidine

In the manner given in Example 13, 2-amino-4-hydroxypyrimidine and α-bromodesoxyanisoin were reacted together in acetonitrile to give 2,3-dianisyl-7-hydroxyimidazo[1,2-a]pyrimidine.

Example 21.—2,3-dianisyl-6-methoxyimidazo[1,2-a]pyrimidine

In the manner given in Example 13, 2-amino-5-methoxypyrimidine and α-bromodesoxyanisoin were reacted together in acetonitrile to give 2,3-dianisyl-6-methoxyimidazo[1,2-a]pyrimidine.

Example 22.—2,3-dianisyl-5-propyl-7-ethoxyimidazo[1,2-a]pyrimidine

In the manner given in Example 13, 2-amino-4-ethoxy-6-propylpyrimidine and α-bromodesoxyanisoin were reacted together in acetonitrile to give 2,3-dianisyl-5-propyl-7-ethoxyimidazo[1,2-a]pyrimidine.

Example 23.—2,3-dianisyl-5-nitro-6-isopropylimidazo[1,2-a]pyrimidine

In the manner given in Example 13, 2-amino-5-isopropyl-6-nitropyrimidine and α-bromodesoxyanisoin were reacted together in acetonitrile to give 2,3-dianisyl-5-nitro-6-isopropylimidazo[1,2-a]pyrimidine.

Example 24.—2,3-dianisyl-7-butylimidazo[1,2-a]pyrimidine

In the manner given in Example 13, 2-amino-4-butylpyrimidine and α-bromodesoxyanisoin were reacted together in acetonitrile to give 2,3-dianisyl-7-butylimidazo[1,2-a]pyrimidine.

In the manner given in Example 13, other 2,3-dianisylimidazo[1,2-a]pyrimidines are produced by reacting a 2-aminopyrimidine with α-bromodesoxyanisoin in acetonitrile. Representative compounds thus obtained include:

2,3-dianisyl-5-ethylimidazo[1,2-a]pyrimidine;
2,3-dianisyl-5-propylimidazo[1,2-a]pyrimidine;
2,3-dianisyl-5-isopropylamidazo[1,2-a]pyrimidine;
2,3-dianisyl-5-butylamidazo[1,2-a]pyrimidine;
2,3-dianisyl-5-isobutylimidazo[1,2-a]pyrimidine;
2,3-dianisyl-5-nitroimidazo[1,2-a]pyrimidine;
2,3-dianisyl-5-hydroxyimidazo[1,2-a]pyrimidine;
2,3-dianisyl-6-propylimidazo[1,2-a]pyrimidine;
2,3-dianisyl-6-ethoxyimidazo[1,2-a]pyrimidine;
2,3-dianisyl-6-nitroimidazo[1,2-a]pyrimidine;
2,3-dianisyl-7-isobutylimidazo[1,2-a]pyrimidine;
2,3-dianisyl-7-methylimidazo[1,2-a]pyrimidine;
2,3-dianisyl-7-methoxyimidazo[1,2-a]pyrimidine;
2,3-dianisyl-7-nitroimidazo[1,2-a]pyrimidine; and the like.

Example 25.—5,6-dianisylimidazo[2,1-b]thiazole

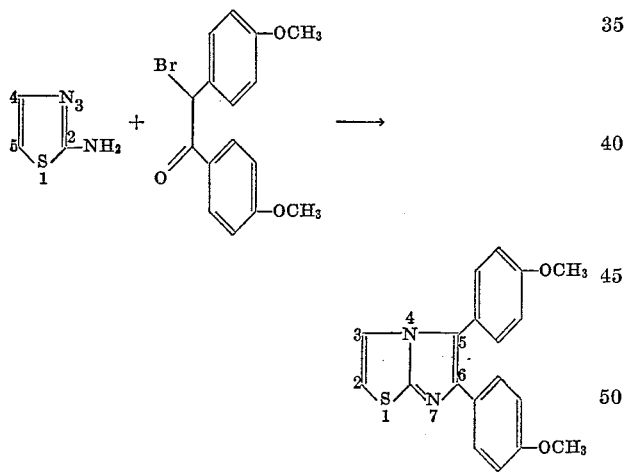

One gram of freshly recrystallized 2-aminothiazole was condensed with 3.35 g. of α-bromodesoxyanisoin in 30 ml. of acetonitrile. The reaction mixture was allowed to stand for 20 hours and was thereupon worked up as in Example 1; the basic fraction was chromatographed over 200 ml. of Florisil using as solvent an acetone-Skellysolve B hexanes mixture (10:90). The crystalline fractions were combined and recrystallized twice from aqueous methanol to give 0.81 g. of 5,6-dianisylimidazo[2,1-b]thiazole of melting point 154–155.5° C. Ultraviolet: $\lambda_{max.}$ 249 (31,600); 285 (15,500).

*Analysis.*—Calcd. for $C_{19}H_{16}N_2O_2S$: C, 67.83; H, 4.79; N, 8.33. Found: C, 68.22; H, 4.94; N, 8.10.

Example 26.—5,6-dianisyl-2-nitroimidazo[2,1-b]thiazole

A solution of 1.45 g. of 2-amino-5-nitrothiazole in 15 ml. of acetonitrile and 15 ml. of dimethylformamide was stirred with 5 g. of α-bromodesoxyanisoin for a period of 20 hours at room temperature. A mixture of red and yellow precipitate had formed. To this mixture was added ether and water and the red solid collected on a filter. The solid was washed once with a small amount of methanol and recrystallized from methylene chloride: ethyl acetate. There was obtained 0.41 g. of red crystalline 5,6-dianisyl-2-nitroimidazo[2,1-b]thiazole of melting point 209–212° C.

*Analysis.*—Calcd. for $C_{19}H_{15}N_3O_4S$: C, 59.83; H, 3.96; N, 11.02. Found: C, 59.54; H, 3.93; N, 10.93.

Example 27.—5,6-dianisyl-2-methylimidazo[2,1-b]thiazole

In the manner given in Example 25, 2-amino-5-methylthiazole and α-bromodesoxyanisoin in acetonitrile were reacted together to give 5,6-dianisyl-2-methylimidazo[2,1-b]thiazole.

Example 28.—5,6-dianisyl-3-butylimidazo[2,1-b]thiazole

In the manner given in Example 25, 2-amino-4-butylthiazole and α-bromodesoxyanisoin in acetonitrile were reacted together to give 5,6-dianisyl-3-butylamidazo[2,1-b]thiazole.

Example 29.—5,6-dianisyl-2-propylimidazo[2,1-b]thiazole

In the manner given in Example 25, 2-amino-5-propylthiazole and α-bromodesoxyanisoin in acetonitrile were reacted together to give 5,6-dianisyl-2-propylimidazo[2,1-b]thiazole.

Example 30.—5,6-dianisyl-2-methoxyimidazo[2,1-b]thiazole

In the manner given in Example 25, 2-amino-5-methoxythiazole and α-bromodesoxyanisoin in acetonitrile were reacted together to give 5,6-dianisyl-2-methoxyimidazo-[2,1-b]thiazole.

Example 31.—5,6-dianisyl-3-ethoxyimidazo[2,1-b]thiazole

In the manner given in Example 25, 2-amino-4-ethoxythiazole and α-bromodesoxyanisoin in acetonitrile were reacted together to give 5,6-dianisyl-3-ethoxyimidazo-[2,1-b]thiazole.

Example 32.—5,6-dianisyl-2,3-diethoxyimidazo[2,1-b]thiazole

In the manner given in Example 25, 2-amino-4,5-diethoxythiazole and α-bromodesoxyanisoin in acetonitrile were reacted together to give 5,6-dianisyl-2,3-diethoxyimidazo[2,1-b]thiazole.

Example 33.—5,6-dianisyl-2-hydroxyimidazo[2,1-b]thiazole

In the manner given in Example 25, 2-amino-5-hydroxythiazole and α-bromodesoxyanisoin in acetonitrile were reacted together to give 5,6-dianisyl-2-hydroxyimidazo-[2,1-b]thiazole.

Example 34.—5,6-dianisyl-3-hydroxyimidazo[2,1-b]thiazole

In the manner given in Example 25, 2-amino-4-hydroxythiazole and α-bromodesoxyanisoin in acetonitrile were reacted together to give 5,6-dianisyl-3-hydroxyimidazo-[2,1-b]thiazole.

Example 35.—5,6-dianisyl-3-butoxyimidazo[2,1-b]thiazole

In the manner given in Example 25, 2-amino-4-butoxythiazole and α-bromodesoxyanisoin in acetonitrile were reacted together to give 5,6-dianisyl-3-butoxyimidazo[2,1-b]thiazole.

In the manner given in Example 25, other 5,6-dianisylimidazo[2,1-b]thiazoles can be made by reacting a substituted 2-aminothiazole with α-bromodesoxyanisoin. Representative compounds thus prepared include:

5,6-dianisyl-2-ethylimidazo[2,1-b]thiazole;
5,6-dianisyl-2-isopropylimidazo[2,1-b]thiazole;

5,6-dianisyl-2-propoxyimidazo[2,1-b]thiazole;
5,6-dianisyl-2-butoxyimidazo[2,1-b]thiazole;
5,6-dianisyl-3-propylimidazo[2,1-b]thiazole;
5,6-dianisyl-3-nitroimidazo[2,1-b]thiazole;
5,6-dianisyl-3-isopropoxyimidazo[2,1-b]thiazole;
5,6-dianisyl-3-isobutoxyimidazo[2,1-b]thiazole; and the like.

Example 36.—5,6-dianisylimidazo[2,1-b]oxazole and its hydrobromide

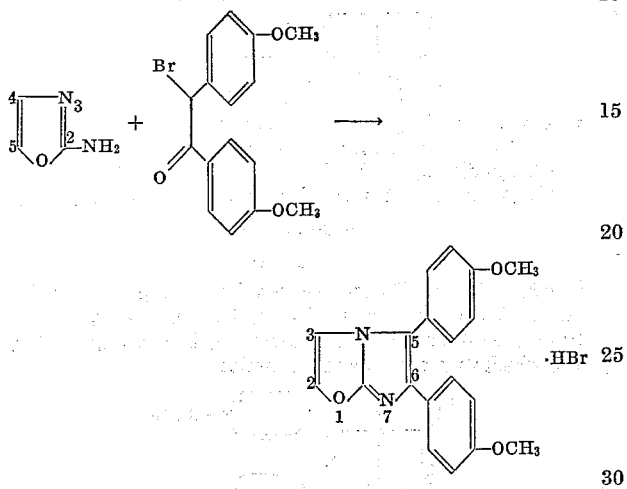

A mixture of 0.23 g. of 2-aminooxazole and 1.0 g. of α-bromodesoxyanisoin in 8.5 ml. of acetonitrile was stirred overnight under nitrogen. The flask was then cooled in ice and the crystalline solid which recipitated was collected on a filter and recrystallized twice from acetonitrile to give 0.16 g. of 5,6-dianisylimidazo[2,1-b]oxazole hydrobromide of melting point 227° with decomposition.

Analysis.—Calcd. for $C_{19}H_{17}BrN_2O_3$: N, 6.98; Br, 19.92. Found: N, 6.96; Br, 19.51.

The hydrobromide was treated with an aqueous solution of potassium bicarbonate; the aqueous mixture was extracted with methylene chloride, the extracts dried and evaporated to give 5,6-dianisylimidazo[2,1-b]oxazole.

Example 37.—5,6-dianisyl-2-methylimidazo[2,1-b]oxazole

In the manner given in Example 36, 2-amino-5-methyloxazole and α-bromodesoxyanisoin in acetonitrile were reacted together to give 5,6-dianisyl-2-methylimidazo[2,1-b]oxazole.

Example 38.—5,6-dianisyl-3-butylimidazo[2,1-b]oxazole

In the manner given in Example 36, 2-amino-4-butyloxazole and α-bromodesoxyanisoin in acetonitrile were reacted together to give 5,6-dianisyl-3-butylimidazo[2,1-b]oxazole.

Example 39.—5,6-dianisyl-2-propylimidazo[2,1-b]oxazole

In the manner given in Example 36, 2-amino-5-propyloxazole and α-bromodesoxyanisoin in acetonitrile were reacted together to give 5,6-dianisyl-2-propylimidazo[2,1-b]oxazole.

Example 40.—5,6-dianisyl-2-methoxyimidazo[2,1-b]oxazole

In the manner given in Example 36, 2-amino-5-methoxyoxazole and α-bromodesoxyanisoin in acetonitrile were reacted together to give 5,6-dianisyl-2-methoxyimidazo-[2,1-b]oxazole.

Example 41.—5,6-dianisyl-3-ethoxyimidazo[2,1-b]oxazole

In the manner given in Example 36, 2-amino-4-ethoxy-oxazole and α-bromodesoxyanisoin in acetonitrile were reacted together to give 5,6-dianisyl-3-ethoxyimidazo[2,1-b]oxazole.

Example 42.—5,6-dianisyl-2,3-diethoxyimidazo[2,1-b]oxazole

In the manner given in Example 36, 2-amino-4,5-diethoxyoxazole and α-bromodesoxyanisoin in acetonitrile were reacted together to give 5,6-dianisyl-2,3-diethoxyimidazo[2,1-b]oxazole.

Example 43.—5,6-dianisyl-2-hydroxyimidazo[2,1-b]oxazole

In the manner given in Example 36, 2-amino-5-hydroxyoxazole and α-bromodesoxyanisoin in acetonitrile were reacted together to give 5,6-dianisyl-2-hydroxyimidazo-[2,1-b]oxazole.

Example 44.—5,6-dianisyl-3-hydroxyimidazo[2,1-b]oxazole

In the manner given in Example 36, 2 - amino-4-hydroxyoxazole and α-bromodesoxyanisoin in acetonitrile were reacted together to give 5,6-dianisyl-3-hydroxyimidazo-[2,1-b]oxazole.

Example 45.—5,6-dianisyl-3-butoxyimidazo[2,1-b]oxazole

In the manner given in Example 36, 2-amino-4-butoxyoxazole and α-bromodesoxyanisoin in acetonitrile were reacted together to give 5,6 - dianisyl - 3 - butoxyimidazo-[2,1-b]oxazole.

Example 46.—5,6-dianisyl-2-nitroimidazo[2,1-b]oxazole

In the manner given in Example 36, 2-amino-5-nitrooxazole and α-bromodesoxyanisoin in acetonitrile were reacted together to give 5,6-dianisyl - 2 - nitroimidazo-[2,1-b]oxazole.

Example 47.—5,6-dianisyl-3-nitroimidazo[2,1-b]oxazole

In the manner given in Example 36, 2 - amino-4-nitrooxazole and α-bromodesoxyanisoin in acetonitrile were reacted together to give 5,6 - dianisyl - 3 - nitroimidazo-[2,1-b]oxazole.

In the manner given in Example 36 other 5,6-dianisylimidazo[2,1-b]oxazoles can be made by reacting a substituted 2-aminooxazole with α-bromodesoxyanisoin. Representative compounds thus prepared include:

5,6-dianisyl-2-ethylimidazo[2,1-b]oxazole;
5,6-dianisyl-2-isopropylimidazo[2,1-b]oxazole;
5,6-dianisyl-2-propoxyimidazo[2,1-b]oxazole;
5,6-dianisyl-2-butoxyimidazo[2,1-b]oxazole;
5,6-dianisyl-3-propylimidazo[2,1-b]oxazole;
5,6-dianisyl-3-isopropoxyimidazo[2,1-b]oxazole;
5,6-dianisyl-3-isobutoxyimidazo[2,1-b]oxazole;

and the like.

I claim:
1. A dianisylimidazole compound of the formula:

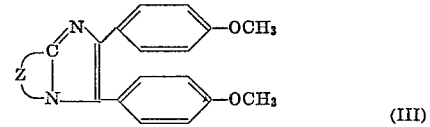

(III)

wherein Z is a bivalent radical selected from the group consisting of:

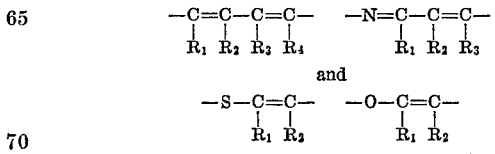

in which up to two of the parameters $R_1$, $R_2$, $R_3$, and $R_4$ are selected from the group consisting of hydrogen, lower alkyl and lower alkoxy having 1 to 4 carbon atoms, inclusive, hydroxy and nitro and the remaining parameters are hydrogen.

2. A compound according to claim 1, wherein Z is

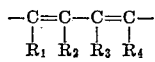

in which up to two of the parameters $R_1$, $R_2$, $R_3$ and $R_4$ are selected from the group consisting of hydrogen, lower alkyl and lower alkoxy having from 1 to 4 carbon atoms, inclusive, hydroxy and nitro, and the remaining parameters are hydrogen, and which therefore has the formula:

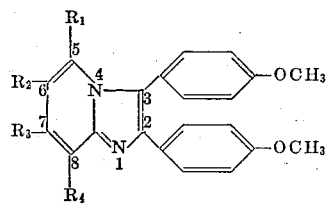

wherein $R_1$, $R_2$, $R_3$ and $R_4$ are defined as above.

3. 2,3-dianisylimidazo[1,2-a]pyridine.
4. 2,3-dianisyl-6-nitroimidazo[1,2-a]pyridine.
5. 2,3-dianisyl-6-methylimidazo[1,2-a]pyridine.
6. 2,3-dianisyl-7-methylimidazo[1,2-a]pyridine.
7. A compound according to claim 1, wherein Z is

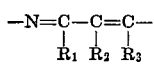

in which up to two of the parameters $R_1$, $R_2$ and $R_3$ are selected from the group consisting of hydrogen, lower alkyl and lower alkoxy having from 1 to 5 carbon atoms, inclusive, hydroxy and nitro, and the remaining parameters are hydrogen and which therefore has the formula:

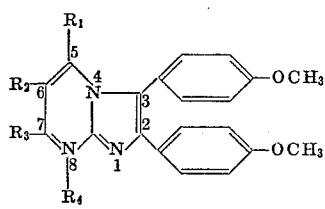

in which $R_1$, $R_2$ and $R_3$ are defined as above.

8. 2,3-dianisylimidazo[1,2-a]pyrimidine.
9. 2,3 - dianisyl - 7 - hydroxy-5-methylimidazo[1,2-a]pyrimidine.

10. A compound according to claim 1, wherein Z is

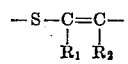

in which $R_1$ and $R_2$ are selected from the group consisting of hydrogen, lower alkyl and lower alkoxy having from 1 to 4 carbon atoms, inclusive, hydroxy and nitro, and which therefore has the formula:

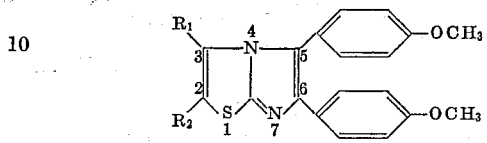

in which $R_1$ and $R_2$ are defined as above.

11. 5,6-dianisylimidazo[2,1-b]thiazole.
12. 5,6-dianisyl-2-nitroimidazo[2,1-b]thiazole.
13. A compound according to claim 1, wherein Z is

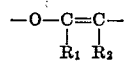

in which $R_1$ and $R_2$ are selected from the group consisting of hydrogen, lower alkyl and lower alkoxy having from 1 to 4 carbon atoms, inclusive, hydroxy and nitro, and which therefore has the formula:

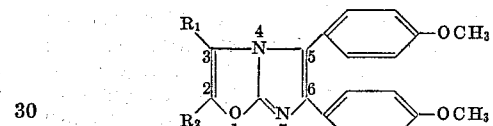

in which $R_1$ and $R_2$ are defined as above.

14. 5,6-dianisyl[2,1-b]oxazole hydrobromide.

References Cited
UNITED STATES PATENTS 2,785,133  3/1957  Craig _____ 260—296
2,969,369  1/1961  Krimmel _____ 260—306.7

ALEX MAZEL, Primary Examiner

R. J. GALLAGHER, Assistant Examiner

U.S. Cl. X.R.

260—256.4, 296, 306.7, 306.8, 307, 307.6; 424—251, 263, 270, 272